United States Patent Office 2,808,399
Patented Oct. 1, 1957

2,808,399

20-ARYLAZO-5,17(20)-PREGNADIEN-3,16a-DIOLS AND ESTERS THEREOF

Raymond M. Dodson, Park Ridge, Ill., assignor, by mesne assignments, to G. D. Searle & Co., Skokie, Ill., a corporation of Delaware No Drawing. Application December 1, 1954,
Serial No. 472,519

10 Claims. (Cl. 260—192)

The present invention relates to a new group of 20-arylazosteroids and, more particularly, to the 20-arylazo-5,17(20)-pregnadien-3,16α-diols and their esters and to the process for their preparation.

These compounds can be represented by the general structural formula

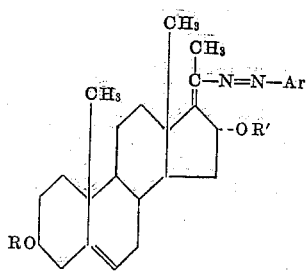

wherein Ar is a member of the class consisting of aryl hydrocarbon radicals containing preferably 6–9 carbon atoms and their halogenated derivatives and wherein R and R' are members of the class consisting of hydrogen and acyl radicals derived from hydrocarbon carboxylic acids containing preferably 1–8 carbon atoms.

In the foregoing structural formula Ar can be an aryl hydrocarbon radical such as phenyl, tolyl, xylyl, cumyl, trimethylphenyl, and the like. The radical Ar can also represent a halogenated derivative of such an aryl radical such as a fluorophenyl, chlorophenyl, bromophenyl, iodophenyl, chlorotolyl, bromoxylyl, or similar radical. The radicals R and R' can be hydrogen or acyl radicals derived from such acids as formic, acetic, propionic, butyric, valeric, caproic, benzoic, toluic, phenylacetic, cyclohexanecarboxylic, cyclohexaneacetic, cyclopentanepropionic acid and the like.

The compounds of this invention are conveniently prepared by a condensation which can be represented as follows

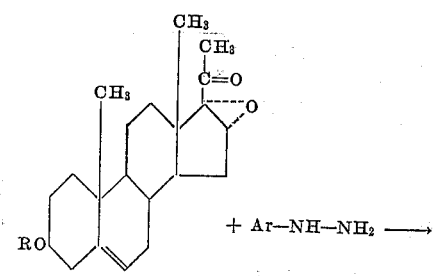

+ Ar—NH—NH$_2$ ⟶

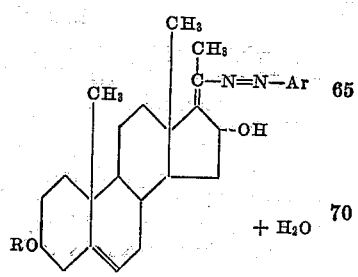

+ H$_2$O

This reaction is conveniently carried out in an organic solvent lacking a carbonyl group, such as a lower alkanol. As in most arylhydrazine condensations a catalytic amount of an acid such as an arylsulfonic acid facilitates the reaction. However, an excess of acid should be avoided for it has been found that treatment of the 16,17-epoxypregnenolone or its 3-ester of the foregoing type with an arylhydrazine in the presence of a larger amount of a lower alkanoic acid such as acetic acid yields the arylhydrazone of a 16α-alkanoyloxy-3,17α-hydroxypregnen-20-one or its 3-ester of the type

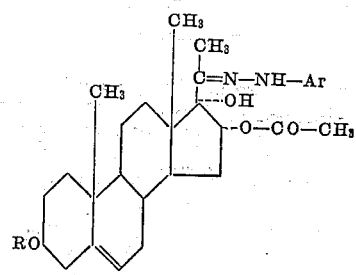

The present invention offers a useful procedure for the introduction of a 16α-hydroxy radical into steroids. Thus, treatment of a 20-arylazo-5,17-pregnadien-3,16α-diol or its ester of the type

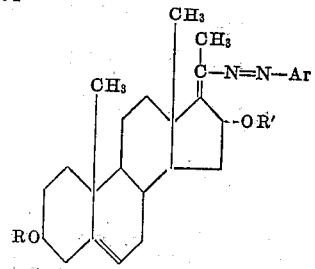

wherein R and R' are defined as hereinabove and Ar is an aryl, haloaryl or nitroaryl radical with acetic acid and aqueous pyruvic acid yields a 16α,17α-dihydroxysteroid of the structural formula

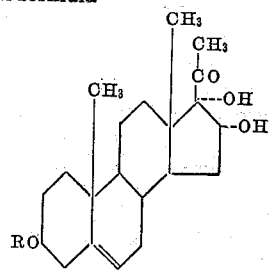

which has valuable hormonal and cardiovascular activity. These compounds are described in detail in the copending application by Frank B. Colton, Serial No. 461,925, filed October 12, 1954, which issued on December 20, 1955 as U. S. 2,727,909.

Reduction of the phenylazo radical with zinc dust followed by hydrolysis of the phenylhydrazone under the above conditions yields 16α-hydroxysteroids of the type

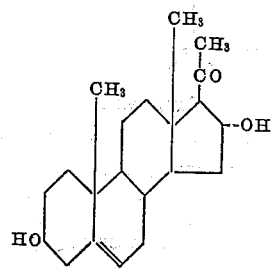

Besides being valuable intermediates in the organic synthesis of other hormonal and cardiovascular agents, the phenylazo compounds of this invention also have pharmaceutically valuable properties. Thus they produce a cortisone-like inhibition in such inflammatory conditions as allegeric iritis without, however, producing the undesirable side effects of cortisone which limit its therapeutic applicability. They are also active antihypertensive agents.

The following examples illustrate in further detail the compounds which constitute this invention and methods for their preparation. However, they are not to be construed as limiting it in spirit or in scope. In these examples quantities of materials are indicated as parts by weight and temperatures in degrees centigrade.

*Example 1*

Under an atmosphere of nitrogen a mixture of 3 parts of 3-hydroxy-16,17-epoxy-5-pregnen-20-one, 3.3 parts of phenylhydrazine, 80 parts of methanol and 0.01 part of p-toluenesulfonic acid are stored at room temperature for 24 hours. The precipitate is collected on a filter and washed thoroughly with methanol. The orange colored 20-phenylazo-5,17(20)-pregnadien-3β,16α-diol thus obtained melts at about 207–209° C. It has the structural formula

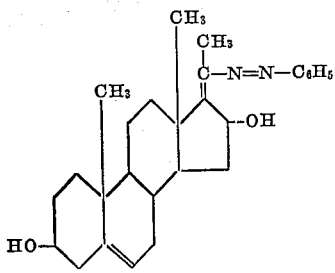

The ultraviolet absorption spectrum shows a maximum at about 315 millimicrons with a molecular extinction coefficient of 23,200.

*Example 2*

A mixture of 1 part of 20-phenylazo-5,17(20)-pregnadien-3,16α-diol, 50 parts of pyridine and 20 parts of acetic anhydride is permitted to stand at room temperature for 15 hours and is then diluted with ice. The orange precipitate is collected on a filter and recrystallized from methanol. The 3β,16α - diacetoxy - 20 - phenylazo - 5, 17(20)-pregnadiene thus obtained melts at about 206–207.5° C. The ultraviolet absorption spectrum shows a maximum at about 314 millimicrons with a molecular extinction coefficient of 27,000. The compound has the structural formula

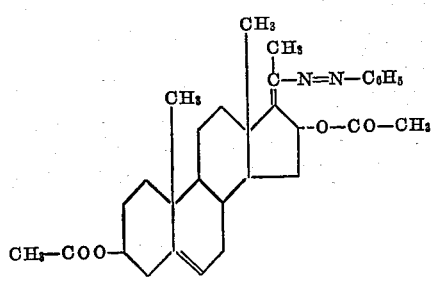

*Example 3*

Under a nitrogen atmosphere a mixture of 3.4 parts of 3-acetoxy-16,17-epoxy-5-pregnen-20-one, 4.5 parts of 2,4,5-trimethylphenylhydrazine, 100 parts of methanol and 0.01 part of p-toluenesulfonic acid is maintained at 25° C. for 24 hours. The resulting precipitate is collected on a filter and washed with methanol to yield the 3 - acetoxy - 20 - (2',4',5' - trimethylphenyl) - azo - 5, 17(20)pregnadien-16α-ol in shining, high-melting orange crystals. The infrared absorption spectrum shows maxima at 2.99, 5.78, 6.12, 7.30, and 8.06 microns. The compound has the structural formula

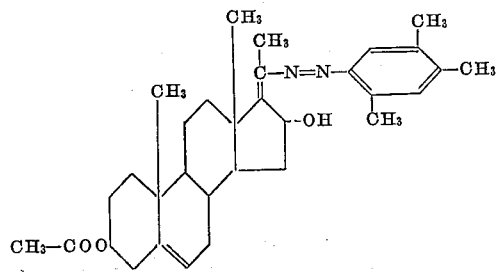

*Example 4*

A mixture of 1 part of 3-hydroxy-16,17-epoxy-5-pregnen-20-one and 1 part of 4-fluorophenylhydrazine in 30 parts of methanol is treated with 0.01 part of p-toluenesulfonic acid and then maintained at room temperature under a nitrogen atmosphere. The resulting precipitate is then collected on a filter and washed with methanol to yield the dark orange colored 20-(4'-fluorophenyl)azo-5,17(20)-pregnadien-3,16α-diol. The infrared absorption spectrum shows maxima at 2.90, 3.00, 6.12, and 7.30 microns. The compound has the structural formula

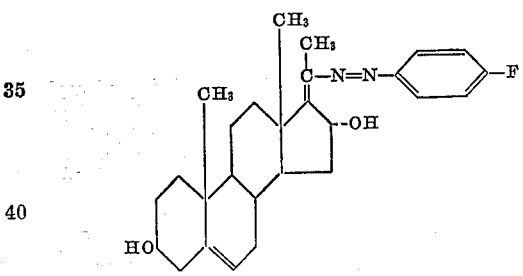

*Example 5*

Condensation of 1 part of 4-chlorophenylhydrazine, 1 part of 3β-hydroxy-16,17-epoxy-5-pregnen-20-one, 30 parts of methanol and 0.01 part of p-toluenesulfonic acid by the method of the preceding example yields the 20-(4'-chlorophenyl)azo-5,17(20)-pregnadien-3,16α-diol in orange prisms. The infrared absorption spectrum shows maxima at 2.89, 3.00, 6.10, and 7.31 microns. The compound has the structural formula

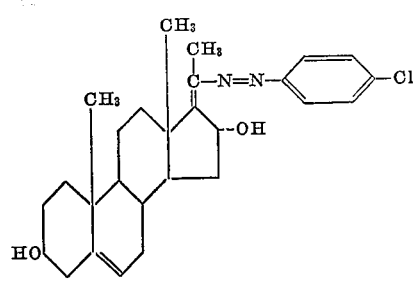

*Example 6*

A mixture of 7 parts of 3-acetoxy-16,17-epoxy-5-pregnen-20-one and 7 parts of 2-iodophenylhydrazine in 250 parts of methanol is treated with 0.02 part of p-toluenesulfonic acid and then permitted to stand under a nitrogen atmosphere at 25° C. for 24 hours after which the yellowish-orange precipitate is collected on a filter and washed with methanol. There is thus obtained the high-melting 3-acetoxy-20-(2'-iodophenyl)azo-5,17-pregnadien-16α-ol. The infrared absorption spectrum shows maxima at 2.98, 5.77, 6.13, 7.30, and 8.04 microns. The compound has the structural formula

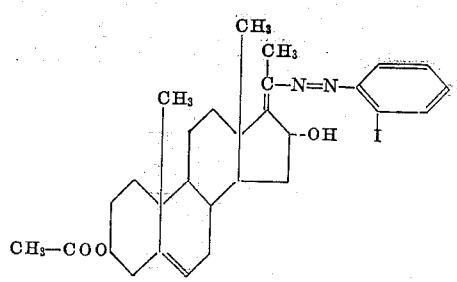

*Example 7*

To a solution of 2 parts of 20-phenylazo-5,17(20)-pregnadien-3,16α-diol in 100 parts of pyridine are added 4 parts of benzoyl chloride and the mixture is maintained at 25° C. for 20 hours. The mixture is then diluted with ether, washed successively with water, 5% aqueous sodium hydroxide and again with water, dried over anhydrous sodium sulfate, filtered and evaporated. The residue is washed with benzene. There is thus obtained 3,16 - dibenzoyloxy - 20 - phenylazo - 5,17(20) - pregnadiene which shows infrared maxima at 6.13 and 7.30 microns. The compound has the structural formula

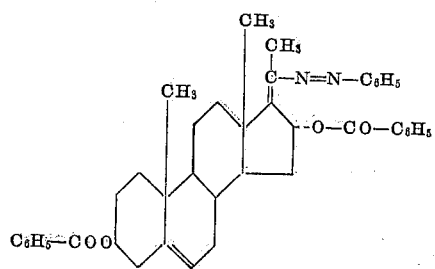

*Example 8*

Substitution of 4.5 parts of β-cyclopentanepropionyl chloride for the benzoyl chloride used in the preceding example yields the 3,16-bis(cyclopentanepropionyloxy)-20-phenylazo-5,17-pregnadiene of the structural formula

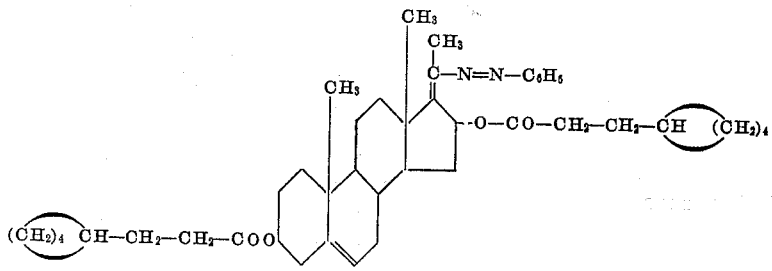

in shining yellowish orange crystals. The infrared absorption spectrum shows maxima at 5.78, 6.12, 6.86, 7.30, and 8.10 microns.

*Example 9*

To a solution of 2.2 parts of 20-phenylazo-5,17(20)-pregnadien-3,16α-diol in 105 parts of glacial acetic acid, there are added 2.2 parts of pyruvic acid in 50 parts of water and the mixture is permitted to stand at room temperature for 24 hours. It is then diluted with water and the precipitate is collected on a filter, dried and crystallized from acetone. The 3β,16α,17α-trihydroxy-5-pregnen-20-one thus obtained melts at about 224–225° C., resolidifies and melts again at about 244–247° C.

*Example 10*

A solution of 10 parts of 20-phenylazo-5,17(20)-pregnadien-3,16α-diol in 200 parts of pyridine is stirred with 10 parts of zinc dust and 10 parts of glacial acetic acid for 10 minutes. The zinc dust is filtered from the solution; the reduced material is precipitated by the addition of water and separated by filtration.

A solution of 6 parts of the reduced material so obtained in 220 parts of glacial acetic acid is treated with 90 parts of water and 10 parts of pyruvic acid. The mixture is shaken and within a few minutes the initial green color fades out. After 20 minutes of standing at room temperature a small precipitate is removed by filtration. The filtrate is allowed to stand at room temperature for 18 hours and then diluted with water. The resulting precipitate is collected on a filter and crystallized from acetone. The 3β,16α-dihydroxy-5-pregnen-20-one thus obtained melts at about 232–235° C. Crystallization from dilute methanol raises the melting point to 241.5–244° C.

What is claimed is:

1. A compound of the structural formula

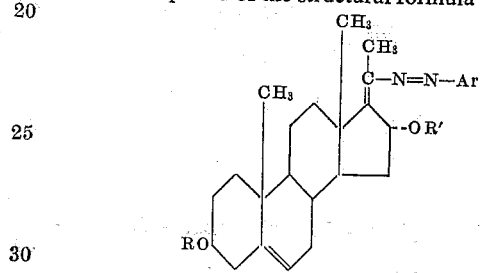

wherein Ar is a member of the class consisting of aryl hydrocarbon radicals containing 6–9 carbon atoms and halophenyl radicals and wherein R and R′ are members of the class consisting of hydrogen benzoyl and acyl radicals derived from alkanoic acids of less than 9 carbon atoms.

2. A compound of the structural formula

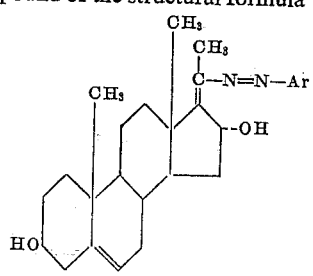

wherein Ar is an aryl hydrocarbon radical containing 6–9 carbon atoms.

3. A compound of the structural formula

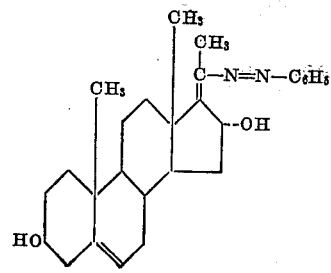

4. A compound of the structural formula

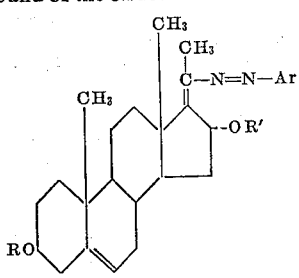

wherein Ar is an aryl hydrocarbon radical containing 6–9 carbon atoms and R and R′ are lower alkanoyl radicals.

5. A compound of the structural formula

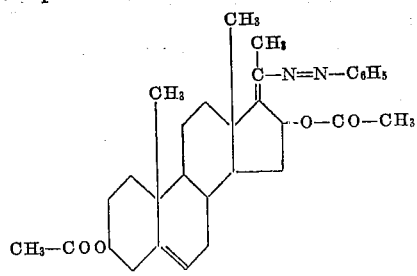

6. 3,16 - dibenzoyloxy - 20 - phenylazo - 5,17(20)-pregnadiene.

7. A compound of the structural formula

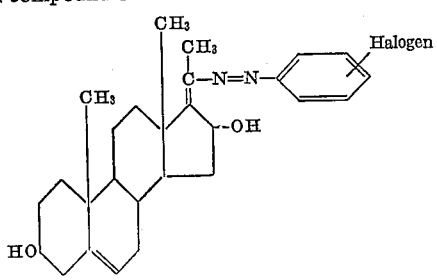

8. A compound of the structural formula

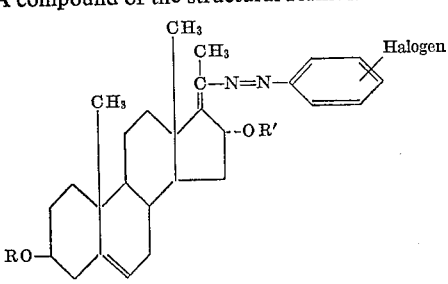

wherein R and R′ are lower alkanoyl radicals.

9. The process of preparing a compound of the structural formula

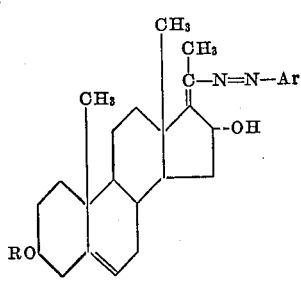

wherein Ar is a member of the class consisting of aryl hydrocarbon radicals containing 6–9 carbon atoms and halophenyl radicals and wherein R is a member of the class consisting of hydrogen, benzoyl and acyl radicals derived from alkanoic acids of less than 9 carbon atoms which comprises mixing of a compound of the structural formula

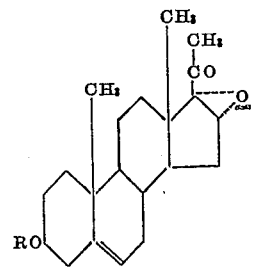

with an equivalent of an arylhydrazine of the structural formula

Ar—NH—NH₂

10. The process of preparing a compound of the structural formula

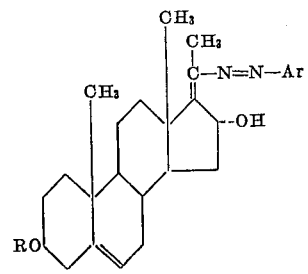

wherein Ar is a member of the class consisting of aryl hydrocarbon radicals containing 6–9 carbon atoms and halophenyl radicals and wherein R is a member of the class consisting of hydrogen, benzoyl and acyl radicals derived from alkanoic acids of less than 9 carbon atoms which comprises mixing of a compound of the structural formula

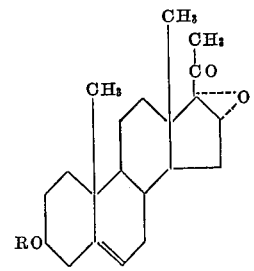

with an equivalent of an arylhydrazine of the structural formula

Ar—NH—NH₂ in a lower alkanol solution.

No references cited.